United States Patent [19]

Tumbush

[11] 3,757,126

[45] Sept. 4, 1973

[54] METHOD OF SETTING MOIRE FRINGE TRANSDUCER READING HEAD SKEW ANGLE AND INPUT STAGE AMPLIFIER GAIN AND BALANCE

[75] Inventor: Gerald L. Tumbush, Xenia, Ohio

[73] Assignee: The Bendix Corporation, Southfield, Mich.

[22] Filed: Aug. 28, 1972

[21] Appl. No.: 284,313

[52] U.S. Cl............... 250/209, 250/237 G, 356/170
[51] Int. Cl. ........................................... G01b 11/04
[58] Field of Search..................... 356/170; 250/220, 250/237 G, 209

[56] References Cited
UNITED STATES PATENTS

| 2,886,717 | 5/1959 | Williamson et al. | 356/170 |
| 2,886,718 | 5/1959 | Shepherd et al. | 250/220 R |
| 3,227,888 | 1/1966 | Shepherd et al. | 250/237 G |
| 3,713,139 | 1/1973 | Sanford et al. | 250/237 G |

Primary Examiner—James W. Lawrence
Assistant Examiner—T. N. Grigsby
Attorney—John R. Benefiel et al.

[57] ABSTRACT

A method of setting the reading head skew angle and the associated input stage amplifier gain and balance of a Moire fringe transducer system is disclosed which can be carried out with a voltmeter. The procedure involves setting the signal d-c level at zero by means of an amplifier balance potentiometer, measuring the a-c output of the input stage amplifier associated with each channel while adjusting the reading head skew angle to obtain a maximum signal, resetting the d-c level at zero, setting the a-c amplitude at the prescribed level by adjusting the amplifier gain and then measuring and setting the phase angle between square waves produced from the 0° and 90° channel sine waves by measuring the effective a-c value produced by the combined 0° and 90° square waves and adjusting the reading head skew angle to obtain a predetermined a-c reading corresponding to the correct phase angle, and then repeating the procedures involved in the last three steps until all of the conditions are met.

2 Claims, 5 Drawing Figures

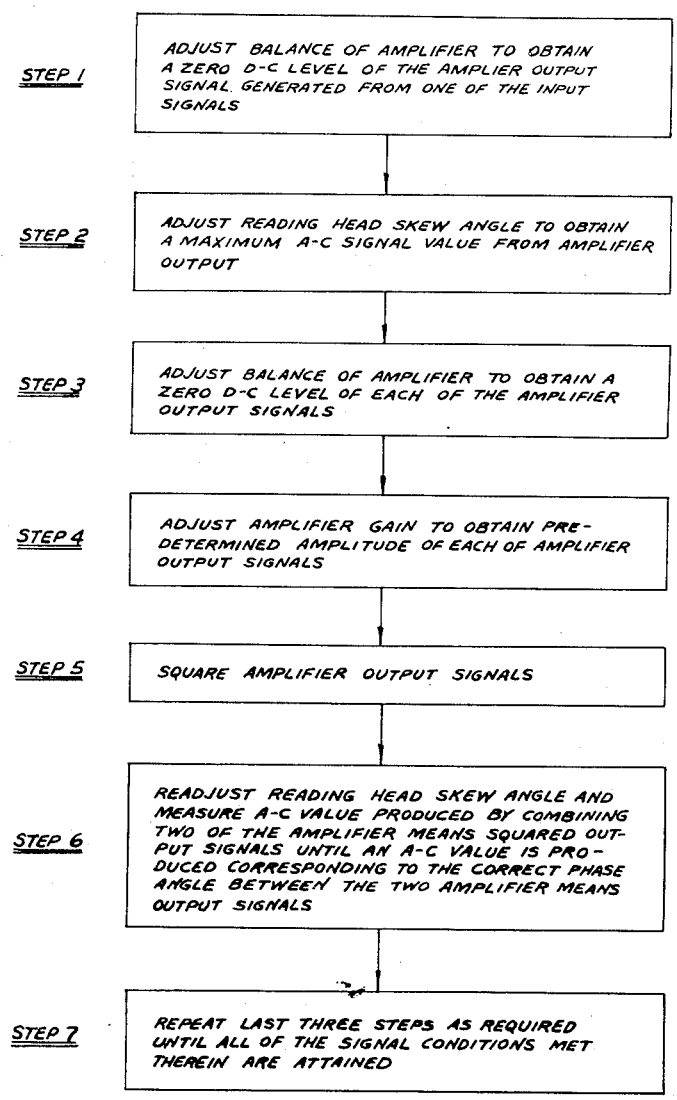

METHOD OF SETTING MOIRE FRINGE TRANSDUCER READING HEAD SKEW ANGLE AND INPUT STAGE AMPLIFIER GAIN AND BALANCE

BACKGROUND OF THE INVENTION

1. Field of the Invention

This invention concerns set-up procedures for Moire fringe displacement transducer systems.

2. Description of the Prior Art

Moire fringe displacement transducer systems of the type described in U.S. Pat. Nos. 2,886,717 and 2,886,718 have enjoyed great success in applications to coordinate measuring machines, as accurate inspections of complex parts may be rapidly and easily carried out. As the cost of these machines has been reduced by simpler designs which are directed to users in small machine and metal-working shops, a set-up procedure which can be carried out by a user has become desirable to further reduce costs.

In doing so, it would, of course, also be desirable to eliminate the need for sophisticated electronic equipment and to enable a user to set up the equipment with the usual simple meters available in such shops, such as a Volt-ohmeter (VOM).

Heretofore, however this type of machine has required the use of an oscilloscope in setting the skew angle of the reading head and the gain and balance of the differential amplifiers used to amplify the signals received from the reading head.

As described in the aforementioned patents, this type of transducer utilizes a main scale and reading head optical gratings, with the reading head grating skewed at a particular angle with respect to the main scale grating to cause a shadow pattern or Moire fringe to be created across the width of the grating. Upon displacement of the reading head grating relative to the main scale grating this pattern shifts laterally across the grating, the amount and direction of shift depending on the extent and direction of relative movement of the reading head and main scale grating.

This pattern is read by four photocells, which, when the skew angle is correctly adjusted, produce four electrical sinusoidal signals related in phase by 0°, 90°, 180° and 270°, with the antiphase signals 0° and 180° and 90° and 270° signals being amplified in reading head differential amplifiers, and then again amplified in input stage amplifiers to produce four amplified corresponding sinusoidal signals. These signals are then converted into square waves by means of a divider circuit and Schmitt triggers for further processing in associated counters, etc., to ultimately produce an output display of the relative displacement of the reading head.

As is known in the art, the number of cyclic distributions of light and dark areas occurring across the grating width is a function of the skew angle, but for proper operation of the system described, the correct pattern is one in which one light and dark area occurs across the grating width.

This position of the reading head is normally located by adjusting the skew angle until a maximum signal amplitude from the a-c component of the photocell signals is obtained, which occurs when the correct number of light and dark areas occurs.

In addition to the need for the correct number of light and dark areas, accurate results from this arrangement requires a precision setting of the reading head skew angle and input stage differential amplifiers gain and balance in order to meet the following conditions:

1. Skew angle at the approximately correct reading head position must finely be adjusted to produce precise phase relationships between photocell signals, as the skew angle also affects the phase relationship between these signals. 2. The amplitude of the output signal from the input stage differential amplifier must equal a predetermined value.

3. The d-c level of input stage amplifier output signals must be zero.

These three requirements must be met due to the nature of the squaring techniques, which involve looking for "zero crossings" of the sinusoidal signals, and hence will be inaccurate if any three of these conditions are not met, as these zero crossings will be shifted by any inaccuracy in these parameters.

Prior art set up procedures involve the use of an oscilloscope to carry out these adjustments by first adjusting the reading head skew angle to produce a correct Lissajous figure, and then adjusting the gain and balance of the input stage differential amplifiers.

The use of an oscilloscope was required since:
a. the output of the photocells occurs at a d-c level above zero, so that the a-c level variation thereof cannot be measured by a simple a-c meter; and
b. the phase relationship between the varying sine waves could not be accurately measured by simple a-c voltmeters.

Accordingly, it is an object of the present invention to provide a method of setting these conditions by means of simple VOM meters.

It is a further object to provide a method of measuring the phase relationship between a-c signals using a VOM meter.

SUMMARY OF THE INVENTION

These and other objects of the present invention which will become apparent upon a reading of the following specification and claims are carried out by a procedure wherein the output of the input stage differential amplifiers are balanced to a zero d-c level, to enable reading of the output thereof with a VOM meter so that the skew angle may be adjusted to obtain a maximum output signal to position the skew angle. The d-c balance is then again adjusted to zero and the gain set to produce the proper amplitude for each channel consisting of the two sets of antiphase signals. The phase angle between the antiphase sets is then set by reading the a-c value produced by combining two square waves generated from the 0° and 90° signals and adjusting the reading head skew angle until a calibration value is obtained which corresponds to the proper phase relationship. The last three steps are repeated until all of the conditions are met.

DETAILED DESCRIPTION

In the following detailed description certain specific terminology will be utilized for the sake of clarity and a specific embodiment will be described in order to provide a complete understanding of the invention, but it is to be understood that the invention is not so limited and may be practiced in a variety of forms and embodiments.

Figure 1:
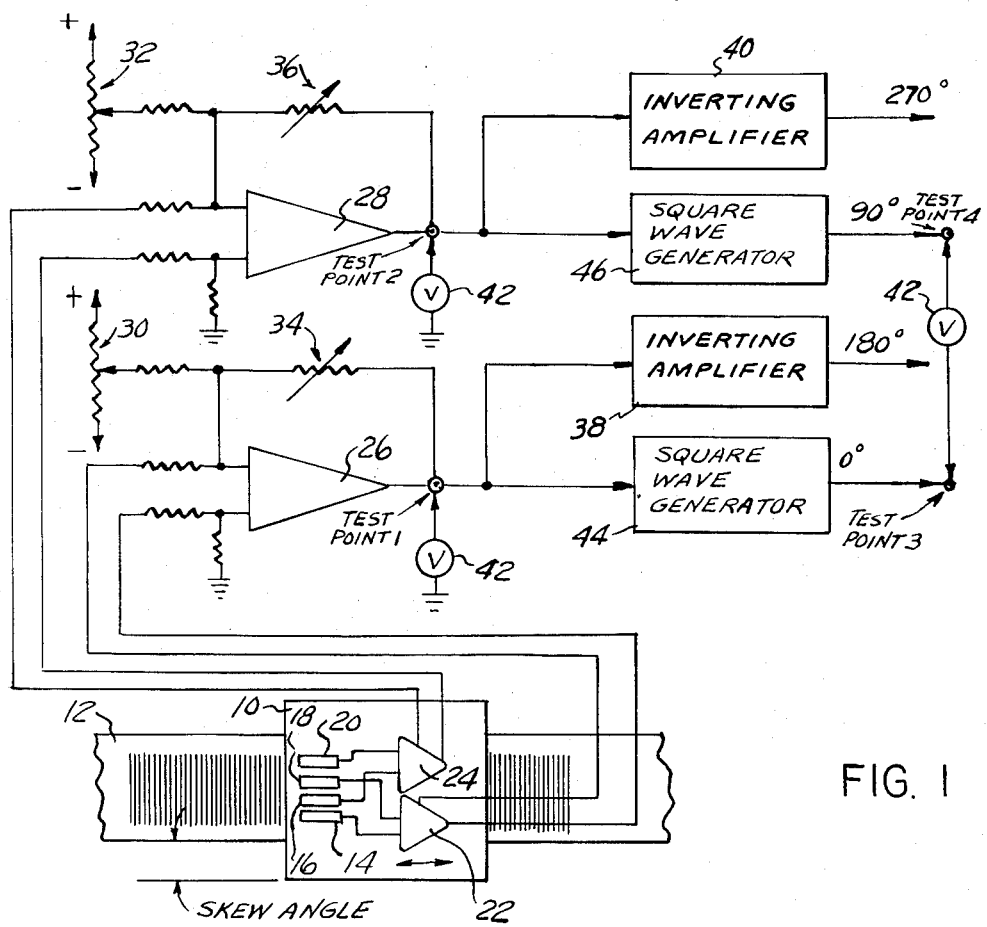
FIG. 1 is a schematic-block diagram representation of the reading head and a portion of the input stage electronics.
Figure 2:
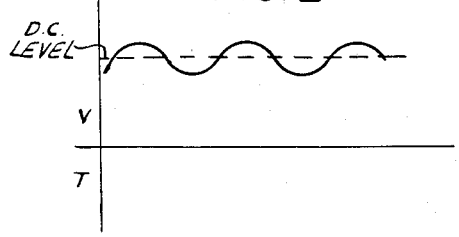
FIG. 2 is a diagrammatic representation of an electrical output signal generated by the reading head.

Referring to the drawings and particularly FIG. 1, the reading head 10 is depicted which is adjustably positioned with respect to the main scale grating 12 at a skew angle to produce the Moire fringe pattern by the interference pattern set up with the grating (not shown) carried by the reading head 10. This pattern is read by the four photocells 14, 16, 18 and 20, which produce (at the proper skew angle) four sinusoidal electrical signals related in phase by 0°, 90°, 180° and 270°. Since the 0° and 180° and the 90° and 270° signals constitute antiphase sets, they may be conveniently amplified in reading head differential amplifiers 22 and 24 to produce two outputs, each of which are precisely 180° out of phase.

Figure 3:
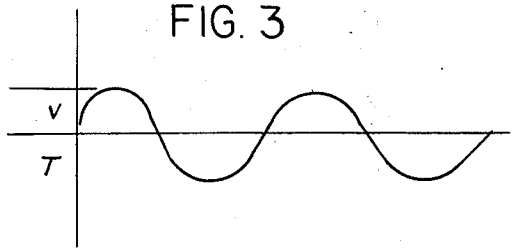
FIG. 3 is a diagrammatic representation of the amplified and balanced electrical output signals from the input stage amplifiers.

These signal sets are then further amplified by amplifier means in the input stage comprising differential amplifiers 26 and 28, which each include a balance potentiometer 30 and 32, and a gain potentiometer 34 and 36, respectively. Each of the outputs of the input stage differential amplifiers is inverted by inverting amplifiers 38 and 40, so that four amplified sinusoidal electrical signals corresponding to the 0°, 90°, 180° and 270° photocell signals are produced which, with the proper adjustments to be described, are of a precisely set amplitude and phase, and vary about a zero d-c level as shown in FIG. 3.

These four signals are transmitted to the remainder of the processing circuitry (not shown) to ultimately produce a digital display of the displacement of the reading head 10, in the manner known in the art.

Referring to FIG. 1, it can be seen that the output of the reading head differential amplifiers 22 and 24 varies about some mean d-c level (typically 3.3 v d-c) and accordingly, variations in the a-c component cannot be read by means of a simple voltmeter to set the skew angle for a maximum signal, to obtain the approximately correct reading head 10 position.

Therefore, according to the present invention the a-c component is measured at the output of the input stage differential amplifiers 26 and 28, at test points 1 and 2 shown in FIG. 1, since the d-c level is set to zero therein by means of the balance pots 30 and 32.

Thus, the first step in the set up procedure according to the present invention (after setting the amplifier gain to some arbitrary minimum starting value) is to set the d-c level of one of the outputs measured at test points 1 or 2 by means of a VOM meter 42 and one of the pots 30 or 32 to zero (while moving the reading head 10).

Then, the reading head 10 skew angle is adjusted to obtain a maximum a-c reading at either test points 1 or 2 (again while moving the reading head 10), to obtain the correct number of light and dark areas as described.

Then, the d-c level is again set at zero for both outputs at test points 1 and 2 and, in addition, the amplitude of each signal at each test point 1 and 2 is set by means of pots 34 and 36 and VOM meter 42 by obtaining a predetermined rms reading on the a-c scale of the VOM meter 42.

Figure 4:
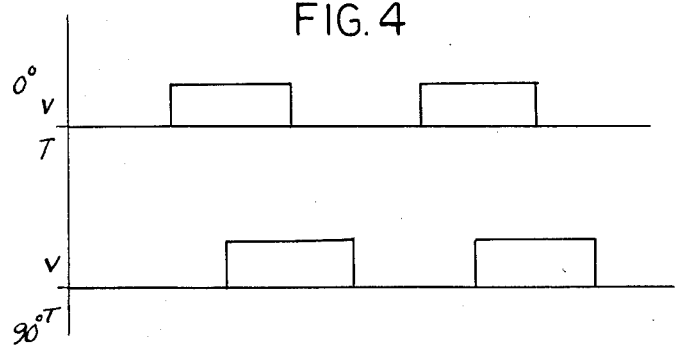
FIG. 4 is a diagrammatic representation of the square waves generated from the 0° and 90° sinusoidal signals.

The phase angle between the 0° and 90° signals is measured according to the present invention by first converting these signals to square waves by means of square wave generators 44 and 46 (the 0° and 90° square waves are shown in FIG. 4) and the phase angle between these is then measured by measuring the effective a-c value produced by the combined signals read between test points 3 and 4. It has been found that the effective a-c values read varies with the phase angle between the square waves, and accordingly an experimentally determined "correct" a-c reading obtained while moving the reading head 10 can be produced across test points 3 and 4 by again adjusting the reading head 10 skew angle.

Two points should be appreciated in connection with this step:

First, the level of the respective square waves must be quite uniform in order for this method to be effective, and since these systems usually include square wave generators in which the level is not closely held (as this is not required for normal signal processing) if any of the existing square wave generators are utilized for this purpose, the use of level converters may be required to accurately set this level.

Secondly, it should be realized that since the 0° and 180° signals and the 90° and 270° signals are antiphase sets, these signals are accurately set at 180° apart by the methods of amplification described, and hence if the phase relationship of either the 0° and 90° or the 180° and 270° signals are set by skew angle adjustment, all of the signals will be accurately phased.

Figure 5:
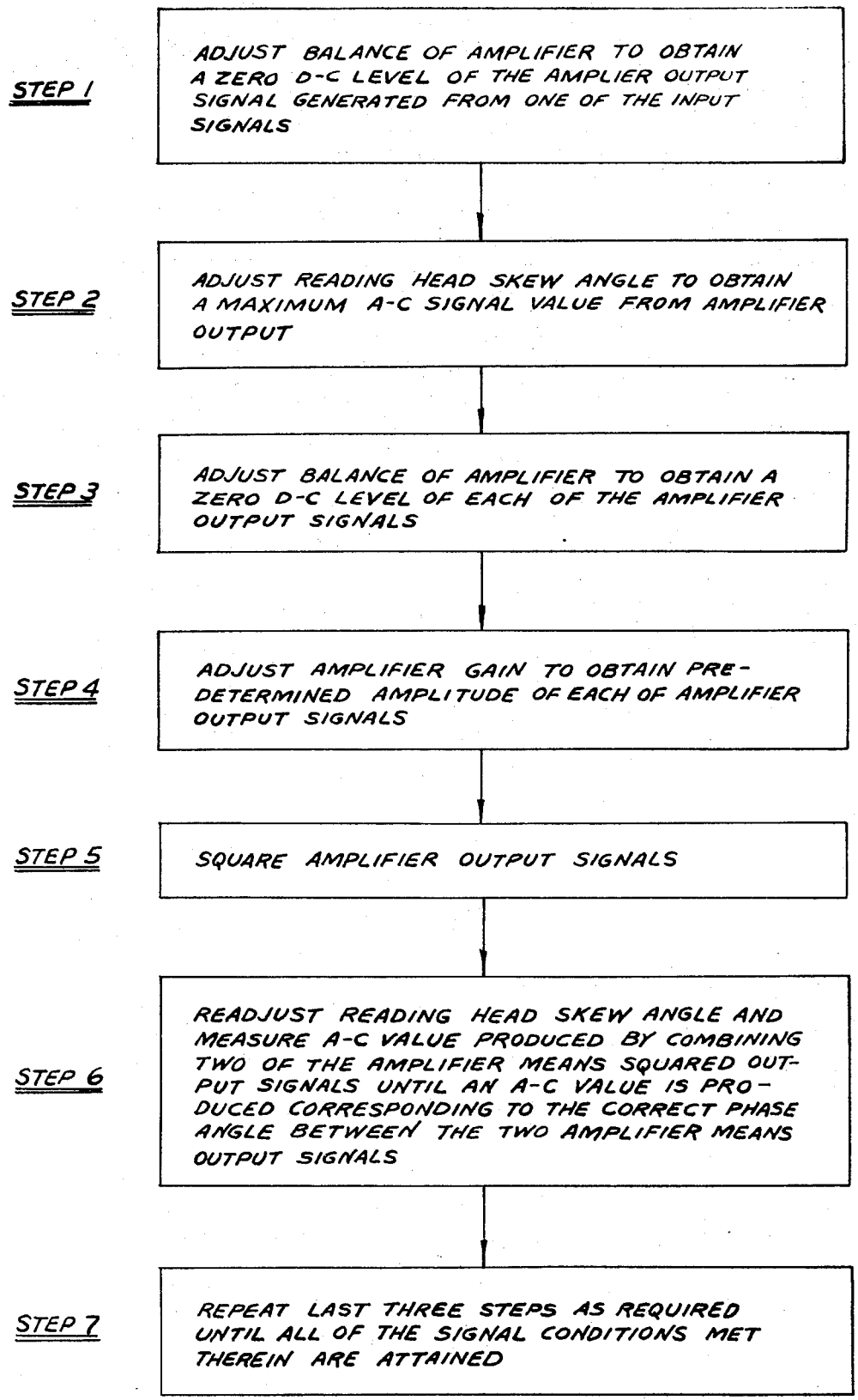
FIG. 5 is a flow diagram depicting the steps according to the method of the present invention.

Since this final adjustment affects the balance and gain adjustments previously made, a process of iteration must be carried out, in which the last three steps, i.e., d-c balance, amplitude, and phase angle must be repeated until all three conditions are met. These steps are depicted graphically in the flow diagram shown in FIG. 5.

Accordingly, it can be appreciated that this method involves only the reading of either d-c or a-c voltage levels, and can therefore be carried out using only a VOM meter so that the above-described objects are attained.

It should be pointed out that other steps are also required in setting up these systems as is known in the art, but which have not been described since they do not form a part of the inventive procedure. These would include the setting of the voltage of the light source to produce photocell signals which can be amplified within the operating range of amplifiers 26 and 28 and also determining if the maximum signal skew angle setting is the proper one, as two possible settings only one of which is correct can be obtained, which is determined by checking the sign of the count produced by reading head movement in one direction or the other.

Many variations of this method are, of course, possible within the scope of the following claims, as for example the 180° and 270° signals could be squared and phased instead of the 0° and 90° to produce the precise skew angle adjustment.

I claim:

1. A method of setting the skew angle of a Moire fringe transducer system reading head which reading head includes a series of photocells, each adapted to produce a cyclically varying electrical signal in response to movement of a fringe pattern relative thereto, and which transducer system includes amplifier means receiving each of said signals, and including adjustable balance means for setting the d-c level of amplifier means output signals generated from said varying electrical signals received from the transducer at zero and also including adjustable gain means for setting the amplitude of said signals at a predetermined level, the method including the steps of:

adjusting the balance of the amplifier means to obtain a zero d-c level of the amplifier means output signal generated from one of said varying electrical signals;

adjusting the reading head skew angle to obtain a maximum a-c signal value from said amplifier means output;

adjusting the balance of the amplifier means to obtain a zero d-c level of the amplifier means output signals generated from each of said varying electrical signals;

adjusting the amplifier means gain to obtain a predetermined amplitude of each of said amplifier means output signals;

again adjusting the reading head skew angle and measuring the a-c value produced by combining two of the amplifier means output signals until an a-c value is produced corresponding to the correct phase angle between said two amplifier means output signals;

repeating the last three steps as required until all of the signal conditions met therein are attained.

2. The method of claim 1 wherein in again adjusting said reading head skew angle step, said amplifier means output signals are first squared before measuring the a-c value produced by combining said two of said amplifier means output signal.

* * * * *